US010261341B2

(12) United States Patent
Allione et al.

(10) Patent No.: US 10,261,341 B2
(45) Date of Patent: Apr. 16, 2019

(54) METHOD FOR DETERMINING THE FEASIBILITY OF AN OPHTHALMIC LENS

(71) Applicant: Essilor International, Charenton-le-Pont (FR)

(72) Inventors: Pascal Allione, Charenton le Pont (FR); Jean-Pierre Chauveau, Charenton le Pont (FR); Daniel Steigelmann, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 14/442,590

(22) PCT Filed: Nov. 13, 2013

(86) PCT No.: PCT/EP2013/073768
§ 371 (c)(1),
(2) Date: May 13, 2015

(87) PCT Pub. No.: WO2014/076156
PCT Pub. Date: May 22, 2014

(65) Prior Publication Data
US 2016/0274376 A1    Sep. 22, 2016

(30) Foreign Application Priority Data
Nov. 14, 2012 (EP) .................................. 12306416

(51) Int. Cl.
*G02C 7/02* (2006.01)

(52) U.S. Cl.
CPC ............. *G02C 7/028* (2013.01); *G02C 7/024* (2013.01); *G02C 7/027* (2013.01)

(58) Field of Classification Search
CPC ........ G02C 7/024; G02C 7/027; G02C 7/028; G02C 13/005
(Continued)

(56) References Cited

U.S. PATENT DOCUMENTS 3,960,442 A * 6/1976 Davis ..................... G02C 7/02
                                                         351/159.52
4,676,610 A * 6/1987 Barkan ................. G02C 7/024
                                                             264/2.5

(Continued)

FOREIGN PATENT DOCUMENTS

EP    2 028 527    2/2009
EP    2 037 314    3/2009
(Continued)

OTHER PUBLICATIONS

B.Bourdoncle et al., "Ray Tracing Through Progressive Ophthalmic Lenses", 1990 International Lens Design Conference, D.T. Moore ed., Proc. Soc. Photo. Opt. Instrum. Eng. Standard, Jun. 1990.

*Primary Examiner* — Nicholas R. Pasko
(74) *Attorney, Agent, or Firm* — Oblon, McClelland, Maier & Neustadt, L.L.P.

(57) ABSTRACT

Method for determining the feasibility of an ophthalmic lens by an ophthalmic lens manufacturing process comprising: an ophthalmic lens data providing step, a set of surface parameters providing step, an optical parameters providing step during which a set of n optical parameters $(P_1, P_2, \ldots, P_n)$ is provided, n being an integer greater than or equal to 1, each optical parameter $P_i$ being provided with a tolerance value $\varepsilon_i$, —a feasibility check determining step, during which the feasibility of the ophthalmic lens by the ophthalmic lens manufacturing process is determined by determining if for i from 1 to n:

$$-\varepsilon_i \leq \left[ \sum_{j=1}^{m} \left( \frac{\partial P_i}{\partial \alpha_j} \right)_0 \times \Delta\alpha_j \right] + A_i \leq \varepsilon_i$$

(Continued)

-continued with $\left(\frac{\partial P_i}{\partial \alpha_j}\right)_0$ the value of the derivative of $P_i$ with respect to the jth surface parameter $\alpha_j$ on the nominal surface and $\Delta\alpha_j$ the value of the jth surface parameter and $A_i$ a combination of terms of order greater or equal to 2 for each $P_i$.

14 Claims, 6 Drawing Sheets

(58) Field of Classification Search
USPC .......................................... 351/159.73–159.77
See application file for complete search history.

(56) References Cited

U.S. PATENT DOCUMENTS

| | | | | |
|---|---|---|---|---|
| 4,838,675 A * | 6/1989 | Barkan | ................... | G02C 7/028 |
| | | | | 351/159.42 |
| 6,318,859 B1 | 11/2001 | Baudart | | |
| 6,755,524 B2 * | 6/2004 | Rubinstein | ............... | G02C 7/02 |
| | | | | 351/159.74 |
| 7,207,675 B1 * | 4/2007 | Chauveau | .............. | G02C 7/025 |
| | | | | 351/159.42 |
| 7,249,850 B2 * | 7/2007 | Donetti | ................... | G02C 7/025 |
| | | | | 351/159.52 |
| 7,472,992 B2 * | 1/2009 | Altheimer | ................ | G02C 7/02 |
| | | | | 351/159.73 |
| 8,313,194 B2 * | 11/2012 | Colas | ........................ | G02C 7/02 |
| | | | | 351/159.73 |
| 9,176,331 B2 * | 11/2015 | Altheimer | .............. | G02C 7/028 |
| 9,671,618 B2 * | 6/2017 | Allione | ................ | G01M 11/025 |
| 2010/0250173 A1 | 9/2010 | Kozu | | |
| 2012/0105800 A1 * | 5/2012 | Allione | ................... | G02C 7/027 |
| | | | | 351/159.74 |
| 2012/0113388 A1 | 5/2012 | Back | | |
| 2013/0155374 A1 * | 6/2013 | Dursteler Lopez | .... | G02C 7/028 |
| | | | | 351/159.77 |
| 2013/0179297 A1 | 7/2013 | Yamakaji | | |
| 2014/0085627 A1 | 3/2014 | Chauveau | | |
| 2015/0286069 A1 * | 10/2015 | Allione | ................ | G01M 11/025 |
| | | | | 351/159.75 |

FOREIGN PATENT DOCUMENTS

| | | | | |
|---|---|---|---|---|
| EP | 2 369 319 | | 9/2011 | |
| WO | WO 99/66308 | | 12/1999 | |
| WO | WO 2009068613 A1 * | | 6/2009 | ............. B24B 13/06 |
| WO | WO-2009068613 A1 * | | 6/2009 | ............. B24B 13/06 |
| WO | WO 2011000845 A1 * | | 1/2011 | ............. G02C 7/027 |
| WO | WO-2011000845 A1 * | | 1/2011 | ............. G02C 7/027 |

* cited by examiner

| Pfv_45 (D) | Pfv_30 (D) | Pfv_60 (D) | Pnv_45 (D) | Pnv_30 (D) | Pnv_60 (D) | Dh_prp (Dpri) | Dv_prp (Dpri) | |
|---|---|---|---|---|---|---|---|---|
| 2.28E-05 | -6.15E-04 | 6.61E-04 | 2.91E-03 | 2.16E-03 | 3.67E-03 | 3.07E-01 | 7.34E-04 | D_Tx (mm) |
| 7.40E-03 | 6.64E-03 | 8.15E-03 | -1.68E-02 | -1.36E-02 | -2.00E-02 | 7.34E-04 | 3.01E-01 | D_Ty (mm) |
| -1.73E-02 | -1.76E-02 | -1.71E-02 | 7.44E-03 | 6.24E-04 | 1.43E-02 | -2.20E-06 | -9.67E-04 | D_Tz (mm) |
| 2.39E-02 | 1.97E-02 | 2.80E-02 | -6.40E-02 | -4.87E-02 | -7.92E-02 | -4.91E-05 | 8.59E-01 | D_Rx (deg) |
| 3.40E-05 | -3.88E-03 | 3.94E-03 | -1.14E-02 | -7.34E-03 | -1.55E-02 | -8.69E-01 | 4.63E-05 | D_Ry (deg) |
| 2.08E-06 | -1.48E-04 | 1.52E-04 | -5.50E-04 | 1.37E-05 | -1.11E-03 | -2.29E-02 | -3.16E-05 | D_Rz (deg) |
| -5.69E-01 | -8.54E-01 | -2.85E-01 | -5.84E-01 | -8.47E-01 | -3.21E-01 | -2.02E-07 | 2.89E-12 | D_xx (su) |
| 2.46E-05 | -2.91E-01 | -2.91E-01 | -2.26E-03 | -1.33E-01 | 1.29E-01 | 5.84E-03 | -2.12E-07 | D_xy (su) |
| -5.77E-01 | -8.74E-01 | -2.80E-01 | -5.67E-01 | -2.86E-01 | -8.48E-01 | -2.42E-07 | 1.16E-02 | D_yy (su) |

Figure 10

| Pfv_45 (D) | Pfv_30 (D) | Pfv_60 (D) | Pnv_45 (D) | Pnv_30 (D) | Pnv_60 (D) | Dh_prp (Dpri) | Dv_prp (Dpri) | |
|---|---|---|---|---|---|---|---|---|
| 5.57E-03 | 7.38E-03 | 3.76E-03 | -5.47E-03 | -8.88E-03 | -2.06E-03 | 4.12E-01 | 1.09E-01 | D_Tx (mm) |
| 6.94E-03 | 8.81E-03 | 5.07E-03 | -1.48E-02 | -1.50E-02 | -1.47E-02 | 1.10E-01 | 2.73E-01 | D_Ty (mm) |
| -1.80E-02 | -1.84E-02 | -1.77E-02 | 1.36E-02 | 5.63E-03 | 2.16E-02 | 6.28E-05 | 7.55E-06 | D_Tz (mm) |
| 2.00E-02 | 1.97E-02 | 2.03E-02 | -6.64E-02 | -5.64E-02 | -7.65E-02 | -9.21E-03 | 8.57E-01 | D_Rx (deg) |
| -1.49E-03 | -4.31E-03 | 1.33E-03 | -7.73E-03 | -5.33E-03 | -2.08E-02 | -8.54E-01 | 9.10E-03 | D_Ry (deg) |
| 6.76E-05 | 1.58E-04 | -2.25E-05 | -1.47E-04 | 2.08E-03 | -2.37E-03 | -3.95E-02 | 3.90E-04 | D_Rz (deg) |
| -5.69E-01 | -7.11E-01 | -4.28E-01 | -5.83E-01 | -7.32E-01 | -4.34E-01 | -8.68E-05 | 3.01E-07 | D_xx (su) |
| 8.42E-03 | -2.43E-01 | 2.60E-01 | 1.40E-02 | -2.39E-01 | 2.68E-01 | 1.24E-02 | -8.63E-05 | D_xy (su) |
| -5.82E-01 | -4.23E-01 | -7.42E-01 | -5.64E-01 | -3.82E-01 | -7.46E-01 | -8.81E-05 | 2.47E-02 | D_yy (su) |

METHOD FOR DETERMINING THE FEASIBILITY OF AN OPHTHALMIC LENS

RELATED APPLICATIONS

This is a U.S. national stage application under 35 USC § 371 of application No. PCT/EP2013/073768, filed on Nov. 13, 2013. This application claims the priority of European application no. 12306416.4 filed Nov. 14, 2012, the entire content of which is hereby incorporated by reference.

FIELD OF THE INVENTION

The invention relates to a method for determining the feasibility of an ophthalmic lens by an ophthalmic lens manufacturing process, the ophthalmic lens being adapted for a wearer and comprising at least two optical surfaces at least one of which is to be manufactured by the ophthalmic lens manufacturing process based on a corresponding surface of a nominal ophthalmic lens.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is typically made of plastic or glass material and generally has two opposite surfaces which co-operate with one another to provide a required corrective prescription. When the positioning or shape of one of these surfaces with respect to the other is inaccurate, optical errors can be created.

Manufacturing of an optical lens to the required prescription requirements typically includes machining the surface of a semi-finished lens or lens blank. Typically, a semi-finished lens has a finished surface, for example the front surface and an unfinished surface, for example the back surface. By machining the back surface (also named "rear surface") of the lens to remove material, the required shape and positioning of the back surface with respect to the front surface for the desired corrective prescription can be generated.

Optical lenses, and in particular ophthalmic lenses, require very high quality manufacturing process in order to obtain high quality optical lenses.

All ophthalmic lens manufacturing processes do not have the same quality, i.e. all the manufacturing processes are not capable of manufacturing a surface with the same accuracy.

In certain situation it may be very useful to have a method for checking beforehand the feasibility of an ophthalmic lens by an ophthalmic lens manufacturing process.

For example, when an eye care professional orders an ophthalmic lens to a lens provider, the lens provider needs to be sure that considering the manufacturing processes available, he is able to manufactured the ordered lens with sufficient optical quality.

When a lens designer works on a new lens design, it may be very useful to have a method for checking that the manufacturing processes at disposal have a sufficiently high quality to manufacture lenses with such new design.

SUMMARY OF THE INVENTION

There is a need for a method for determining the feasibility of an ophthalmic lens by an ophthalmic lens manufacturing process.

One object of the present invention is to provide such a method.

To this end, one aspect of the invention is directed to a method, implemented by computer means, for determining the feasibility of an ophthalmic lens by an ophthalmic lens manufacturing process, the ophthalmic lens being adapted for a wearer and comprising at least two optical surfaces at least one of which is to be manufactured by the ophthalmic lens manufacturing process based on a corresponding surface of a nominal ophthalmic lens also named "nominal surface", the method comprising:

an ophthalmic lens data providing step during which data representing the surfaces of the nominal ophthalmic lens is provided, a set of surface parameters providing step during which a set of m surface parameters $(\alpha_1, \alpha_2, \ldots, \alpha_m)$ is provided, m being an integer greater than or equal to 1, the surface parameters representing the differences in position and/or shape of the at least one manufactured surface of an ophthalmic lens with the nominal surface, a optical parameters providing step during which a set of n optical parameters $(P_1, P_2, \ldots, P_n)$ is provided, n being an integer greater than or equal to 1, each optical parameter $P_i$ being provided with a tolerance value $\varepsilon_i$ defined in reference to a nominal value $P_{i,0}$ being the value of the optical parameter $P_i$ of the nominal ophthalmic lens, a feasibility check determining step, during which the feasibility of the ophthalmic lens by the ophthalmic lens manufacturing process is determined by determining if for i from 1 to n:

$$-\varepsilon_i \leq \left[\sum_{j=1}^{m} \left(\frac{\partial P_i}{\partial \alpha_j}\right)_0 \times \Delta\alpha_j\right] + A_i \leq \varepsilon_i$$

with $\left(\frac{\partial P_i}{\partial \alpha_j}\right)_0$ the value of the derivative of $P_i$ with respect to the jth surface parameter $\alpha_j$ on the nominal surface and $\Delta\alpha_j$ the value of the jth surface parameter and $A_i$ a combination of terms of order greater or equal to 2 for each $P_i$.

Advantageously, the method according to the invention allows checking the feasibility of an ophthalmic lens by an ophthalmic lens manufacturing process without manufacturing any ophthalmic lens for test.

Furthermore, the check is based on optical parameters which are the most relevant parameters for an ophthalmic lens because they are related to the end-user of the lenses: the lens wearer. Indeed, although surface parameters may be interesting parameters, the ultimate goal of an ophthalmic lens being to provide optical properties, being able to carry out a feasibility check on the base of optical parameters is most relevant.

The method according to the invention may also be used to determine the most suitable manufacturing method for manufacturing a given ophthalmic lens. In particular one may selected the manufacturing method having the best value for money.

The method according to the invention may also be used to segment a number of ophthalmic lens manufacturing processes according to the type of ophthalmic lenses to be manufactured. Therefore, high quality processes are used only when such high quality is required for the optical quality of the manufactured ophthalmic lens and average quality processes can be used to manufacture less demanding ophthalmic lenses.

According to further embodiments which can be considered alone or in any possible combination:

during the feasibility check determining step at least part, for example all, of the feasibility checks are determined by setting for i from 1 to n:

$$A_i = \frac{1}{2}\left[\sum_{j,k=1}^{m}\left(\frac{\partial^2 P_i}{\partial \alpha_j \partial \alpha_k}\right)_0 \times \Delta\alpha_j \times \Delta\alpha_k\right]$$

with $\left(\frac{\partial^2 P_i}{\partial \alpha_j \partial \alpha_k}\right)_0$ the value of the second derivative of $P_i$ with respect to the jth surface parameter $\alpha_j$ and the kth surface parameter $\alpha_k$ on the nominal surface, $\Delta\alpha_j$ the value of the jth surface parameter and $\Delta\alpha_k$ the value of the kth surface parameter; and/or during the feasibility check determining step at least part, for example all, of the feasibility checks are determined by setting $A_i$=0; and/or the ophthalmic lens is a progressive multifocal ophthalmic lens; and/or the manufactured surface is a non-symmetric surface; and/or at least one optical parameter is determined under given wearing conditions defined by at least a position of one of the surfaces of the ophthalmic lens, for example the rear surface of the ophthalmic lens, with respect to a position of the center of rotation of the eye of the wearer and a pantoscopic angle and a wrap angle of the ophthalmic lens; and/or the wearing conditions are defined from measurements on the wearer and a spectacle frame chosen by the wearer; and/or the at least one optical parameter is determined under usual wearing conditions with a primary viewing direction intersecting the fitting cross of the ophthalmic lens, a distance between the center of rotation of the eye of the wearer and a rear face of the ophthalmic lens of 27 mm, the pantoscopic angle of 8° and the wrap angle of 0°; and/or at least one optical parameters is determined with the ophthalmic lens in a position with relation to the eye of the wearer, defined by a pantoscopic angle of 8°, a lens-pupil distance of 12 mm, a pupil-eye rotation center of 13.5 mm and a wrap angle of 0°; and/or at least an optical parameter is a local optical parameter, for example the at least optical parameters is selected among the list consisting of: spherical power, astigmatism amplitude and axis, vertical prismatic deviation, horizontal prismatic deviation, total prismatic deviation; and/or at least an optical parameters is defined at at least one reference point, for example the at least one reference point is selected among the list consisting of: the near vision point, the far vision point, the prism reference point, the fitting cross; and/or at least an optical parameter is a global optical parameter, for example defined on a zone corresponding to a vision cone, the vision cone being a cone with the axis of the vision cone passing through the center of rotation of the eye and a reference point of the ophthalmic lens, for example the near vision point, the far vision point, the prism reference point, the fitting cross, the aperture of the vision cone being greater than or equal to 5°, for example greater than or equal to 10°, and smaller than or equal to 20°, for example smaller than or equal to 15°; and/or at least an optical parameter is selected in the list of optical parameters defined in the one of the standard standards ISO 8980-1, or ISO 8980-2, or ISO 21987; and/or the tolerance value are set as in the one of the standards ISO 8980-1, ISO 8980-2, or ISO 21987; and/or the value $\Delta\alpha_j$ of the jth surface parameter is an average value of such surface parameter, for example the average value of the surface parameters obtained on similar ophthalmic lenses; and/or the set of m surface parameters ($\alpha_1$, $\alpha_2$, . . . , $\alpha_m$) comprises at least position parameters and deformation parameters; and/or the values of surface parameters are obtained by a method implemented by computer means for determining surface parameters defining the relative position of a manufactured derivable surface with respect to a nominal surface, the method comprising:

a nominal surface providing step during which a nominal surface of an ophthalmic lens mounted in a nominal frame of reference and corresponding to the theoretical derivable surface to be manufactured with a nominal value of the position parameters defining the position of the nominal surface with respect to the reference surface is provided, a measured surface providing step during which a measured surface of the manufactured derivable surface expressed in the nominal frame of reference is provided, a deformation surface providing step during which at least one deformation surface defined by at least one deformation adjustable parameter is provided, a composed surface determining step during which a composed surface is determined by adding the measured surface and the deformation surface, a surface parameter determining step during which the position parameters and at least one deformation parameter are determined by minimizing the difference between the nominal surface and the composed surface; and/or the parameter determining step further comprises a zone determining step in which a zone of interest is determined in the nominal surface and the position and deformation parameters are determined by minimizing the difference between the nominal surface and the composed surface in the zone of interest; and/or the parameter determining step is implemented by using a damped least squares process; and/or the position parameters comprise at least six parameters, for example three translation parameters ($T_x$, $T_y$, $T_z$) and three rotation parameters ($R_x$, $R_y$, $R_z$) of the at least one manufactured surface of the ophthalmic lens with respect to the at least one corresponding surface of the nominal ophthalmic lens; and/or the deformation surface corresponds to a sphero-torus surface defined by a sphere parameter, a cylinder parameter and an axis parameter; and/or the deformation surface corresponds to a right circular cone defined by an axis parameter and an angle parameter.

According to a further aspect, the invention relates to a computer program product comprising one or more stored sequences of instructions that are accessible to a processor and which, when executed by the processor, causes the processor to carry out the steps of the method according to an embodiment of the invention.

Another aspect of the invention relates to a computer readable medium carrying one or more sequences of instructions of the computer program product according to an embodiment of the invention.

Another aspect of the invention relates to a program which makes a computer execute the method to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawing in which FIG. 10 is a table illustrating an example of implementation of the invention, FIG. 11 is a table illustrating a further example of implementation of the invention,

DETAILED DESCRIPTION OF THE DRAWINGS

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ of a surface is defined at any point on said surface by the formula:

$$CURV_{min} = \frac{1}{R_{max}}$$

where $R_{max}$ is the maximum radius of curvature of the surface, expressed in meters and $CURV_{min}$ is expressed in dioptres.

Similarly, a maximum curvature $CURV_{max}$ of a surface can be defined at any point on the surface by the formula:

$$CURV_{max} = \frac{1}{R_{min}}$$

where $R_{min}$ is the minimum radius of curvature of the surface, expressed in meters and $CURV_{max}$ is expressed in dioptres.

It can be noticed that when the surface is locally spherical, the minimum radius of curvature $R_{max}$ and the maximum radius of curvature $R_{max}$ are identical and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the refractive index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the refractive index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:
if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL = |SPH_{max} - SPH_{min}|$.

The characteristics of any aspherical face of the lens may be expressed by the local mean spheres and cylinders. A surface can be considered as locally aspherical when the cylinder is at least 0.25 diopters.

Figure 1:
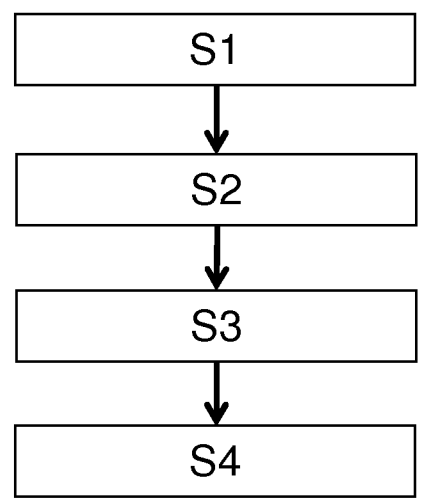
FIG. 1 is flowchart representing the steps of a method according to an embodiment of the invention.
Figure 2:
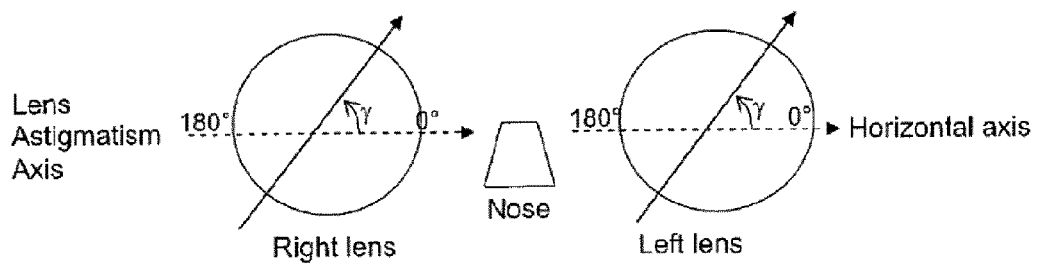
FIG. 2 illustrates the astigmatism axis γ of a lens in the TABO convention.

For an aspherical surface, a local cylinder axis $\gamma_{AX}$ may further be defined. FIG. 2 illustrates the astigmatism axis $\gamma$ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer ($0° \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

Figure 3:
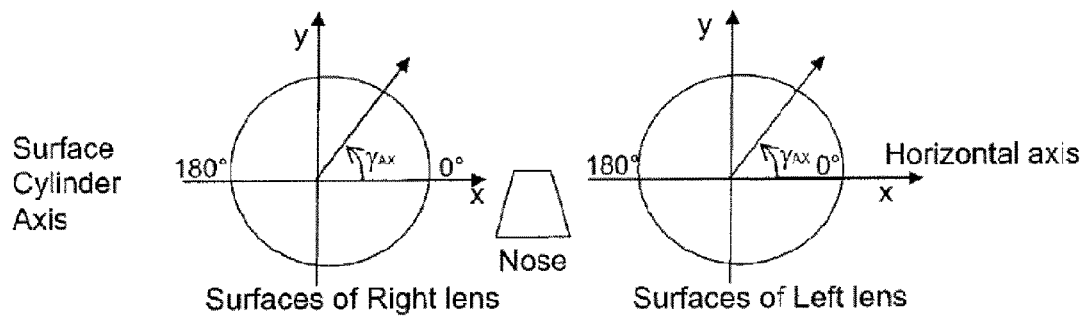
FIG. 3 illustrates the cylinder axis $\gamma_{AX}$ in a convention used to characterize an aspherical surface.
Figure 4:
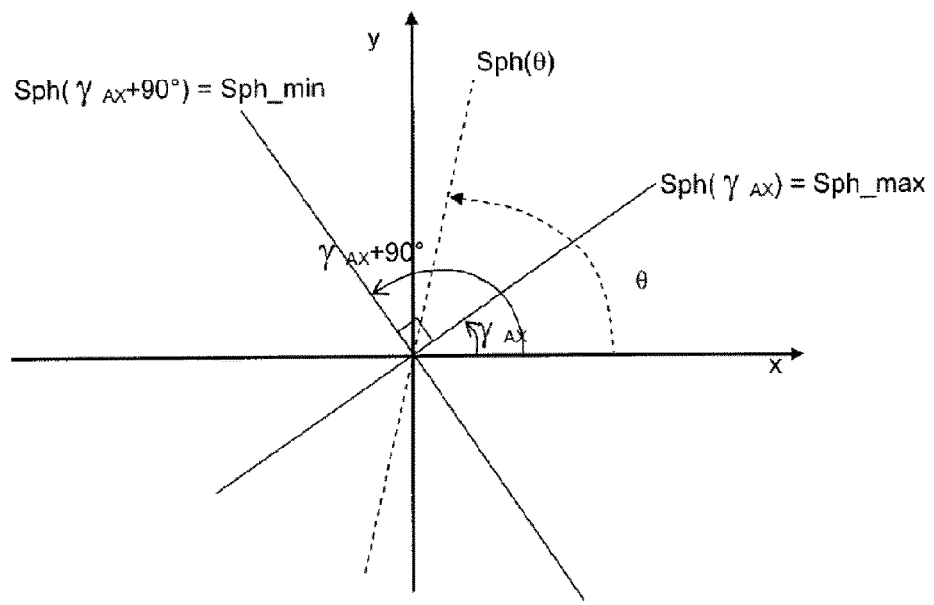
FIG. 4 illustrates the local sphere along any axis.

In addition, based on the knowledge of the value of the local cylinder axis $\gamma_{AX}$, Gauss formula enables to express the local sphere SPH along any axis θ, θ being a given angle in the referential defined in FIG. 3. The axis θ is shown in FIG. 4.

$$SPH(\theta) = SPH_{max} \cos^2(\theta - \gamma_{AX}) + SPH_{min} \sin^2(\theta - \gamma_{AX})$$

As expected, when using the Gauss formula, $SPH(\gamma_{AX}) = SPH_{max}$ and $SPH(\gamma_{AX} + 90°) = SPH_{min}$.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$ the cylinder CYL and the cylinder axis $\gamma_{AX}$.

Figure 5:
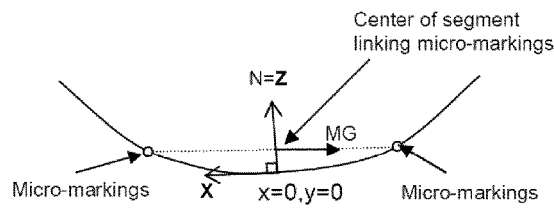
FIGS. 5 and 6 show referential defined with respect to micro-markings, for a surface bearing micro-markings and for a surface not bearing the micro-markings respectively.
Figure 6:
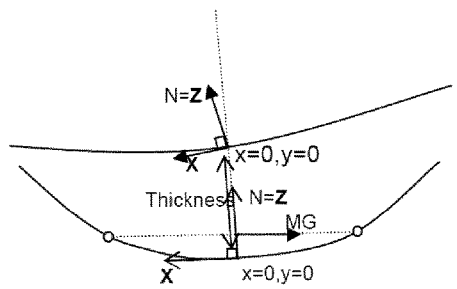

Whenever a lens is characterized by reference to one of its aspherical surfaces, a referential is defined with respect to micro-markings as illustrated in FIGS. 5 and 6, for a surface bearing micro-markings and for a surface not bearing any micro-markings respectively.

Progressive lenses comprise micro-markings that have been made mandatory by a harmonized standard ISO 8990-2. Temporary markings may also be applied on the surface of the lens, indicating diopter measurement positions (sometimes referred to as control points) on the lens, such as for far vision and for near vision, a prism reference point and a fitting cross for instance. It should be understood that what is referred to herein by the terms far vision diopter measurement position ("FV position") and near vision diopter measurement position ("NV position") can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The micro-markings also make it possible to define referential for both surfaces of the lens.

FIG. 5 shows the referential for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

FIG. 6 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the machined surface of a semifinished lens blank can therefore be determined as well as a referential as described above.

Figure 7:
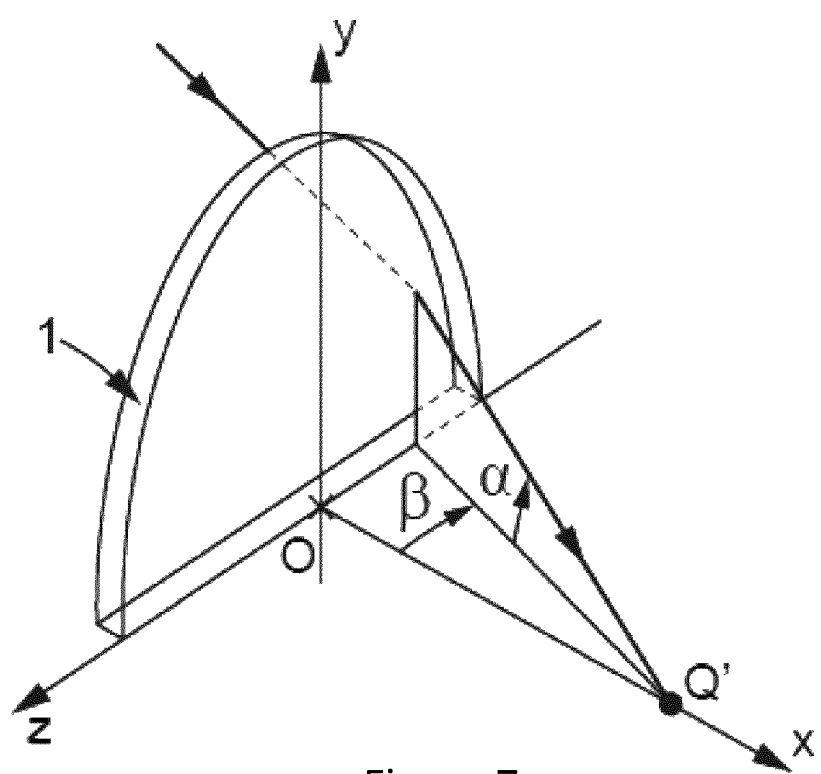
FIGS. 7 and 8 show, diagrammatically, optical systems of eye and lens.
Figure 8:
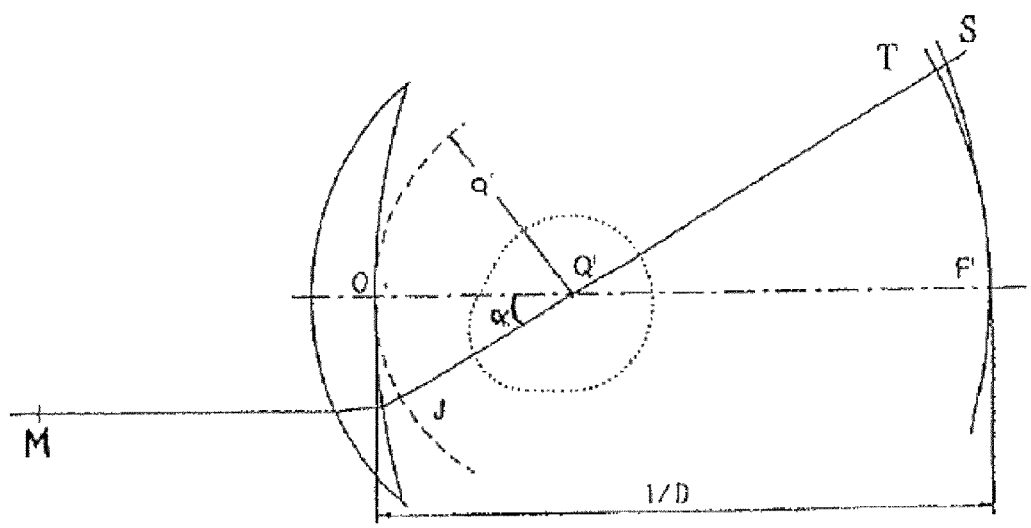

FIGS. 7 and 8 are diagrammatic illustrations of optical systems of eye and lens, thus showing the definitions used in the description. More precisely, FIG. 7 represents a perspective view of such a system illustrating parameters α and β used to define a gaze direction. FIG. 8 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 8 in a dot-dash line, is the horizontal axis passing through the center of rotation of the eye and extending in front of the wearer—that is the axis Q'F' corresponding to the primary gaze view. This axis cuts the back surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 7—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 7. The angle α is the angle formed between the axis Q'J and the projection of the straight line Q'J on the horizontal plane comprising the axis Q'F'; this angle appears on the scheme on FIGS. 7 and 8. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 9:
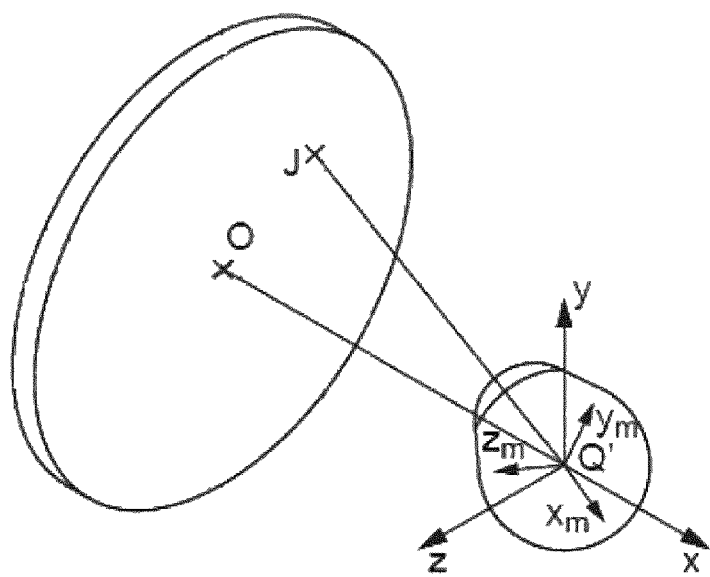
FIG. 9 shows a ray tracing from the center of rotation of the eye.

FIG. 9 represents a perspective view of a configuration wherein the parameters α and β are non zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is oriented from the lens toward the eye. The y axis is vertical and oriented upwardly. The z axis is such that the frame {x, y, z} be orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 5 and 6.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—back surface or front surface.

The above description made with reference to FIGS. 7-9 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 3, 5 and 6, and preferably to a value along the y axis inferior to the y_value at the fitting cross.

The method according to the invention is a method, implemented by computer means, for determining the feasibility of an ophthalmic lens by an ophthalmic lens manufacturing process, the ophthalmic lens being adapted for a wearer and comprising at least two optical surfaces at least one of which is to be manufactured by the ophthalmic lens manufacturing process based on a corresponding surface of a nominal ophthalmic lens also named "nominal surface".

According to different embodiments of the invention, the ophthalmic lens may be a single vision ophthalmic lens, a multifocal ophthalmic lens, or a progressive multifocal ophthalmic lens.

According to an embodiment of the invention, the ophthalmic lens is adapted for a wearer; in particular the ophthalmic lens is adapted to the prescription of the wearer.

The feasibility check according to the method of the invention is based on a set of n optical parameters ($P_1$, $P_2$, ..., $P_n$) with n an integer greater than or equal to 1.

According to an embodiment at least one optical parameter $P_i$ is determined, for example all optical parameters ($P_1$, $P_2$, ..., $P_n$) are determined, under specific conditions defined by at least a reference point out of the ophthalmic lens and the position and orientation of the ophthalmic lens with respect to the reference point.

The specific conditions may be wearing conditions and the reference point may represent a center of rotation of an eye of a wearer. The position and orientation of the ophthalmic lens may be defined by the position the position of one of the surfaces of the ophthalmic lens, for example the rear surface of the ophthalmic lens, with respect to a position of the center of rotation of the eye of the wearer and a pantoscopic angle and a wrap angle of the ophthalmic lens.

According to an embodiment in which the ophthalmic lens is adapted for a wearer, the wearing conditions may be obtained by specific measurements on the wearer, thus increasing the accuracy of the method according to the invention.

Usual wearing conditions may also be used to define at least one, for example all, of the optical parameters.

Usual wearing conditions may be defined by a primary viewing direction of the wearer intersecting the fitting cross of the ophthalmic lens, a distance between the center of rotation of the eye and the rear face of the ophthalmic lens of 27 mm, the pantoscopic angle of 8° and the wrap angle of 0°.

Alternatively, usual wearing conditions may be defined considering the pupil of the wearer. Such wearing conditions may be defined by a pantoscopic angle of 8°, a lens-pupil distance of 12 mm, a pupil-eye rotation center distance of 13.5 mm and a wrap angle of 0°.

According to an embodiment, at least one optical parameter is a local optical parameter. For example the optical parameters may be selected among the list consisting spherical power, astigmatism amplitude and axis, vertical prismatic deviation, horizontal prismatic deviation, total prismatic deviation.

Other examples of optical parameters are defined in the ISO standard:
ISO 8980-1 for none edged single vision ophthalmic lenses, or
ISO 8980-2 for none edged multifocal ophthalmic lenses, or
ISO 21987 for edged ophthalmic lenses.

Each local optical parameter can be defined at a reference point. For example, for a multifocal ophthalmic lens, the reference point may be selected in the list consisting of: the near vision point, the far vision point, the prism reference point, the fitting cross.

According to an embodiment, at least one optical parameter is a global optical parameter.

The global optical parameter is defined on a zone corresponding to the intersection of a cone and one of the surfaces of the ophthalmic lens. The axis of the cone passes through a first and second reference points. The first reference point is a point situated out of the ophthalmic lens and the second reference is point located on one of the surfaces of the ophthalmic lens.

The cone may be a vision cone and the first reference point is than the center of rotation of the eye. For example, if the ophthalmic lens is adapted to a wearer, the first reference point may correspond to the center of rotation of the eye of the wearer.

The second reference point may be, in the case of a multifocal ophthalmic lens, the near vision point, the far vision point, the prism reference point or the fitting cross.

According to an embodiment, the aperture of the cone is greater than or equal to 5°, for example greater than or equal to 10°, and smaller than or equal to 20°, for example smaller than or equal to 15°.

According to an embodiment of the invention, the method of the invention may comprise:
- an ophthalmic lens data providing step S1,
- a set of surface parameters providing step S2,
- a optical parameters providing step S3, and
- a feasibility check determining step S4, During ophthalmic lens data providing step S1, data representing the surfaces of a nominal ophthalmic lens is provided.

As indicated previously, the nominal ophthalmic lens may be a single vision ophthalmic lens, a multifocal ophthalmic lens or a multifocal progressive ophthalmic lens.

During the set of surface parameters providing step S2, a set of m surface parameters $(\alpha_1, \alpha_2, \ldots, \alpha_m)$ is provided, m being an integer greater than or equal to 1.

The surface parameters represent the differences in position and/or shape of the at least one manufactured surface of an ophthalmic lens with the nominal surface.

According to an embodiment of the invention, the set of m surface parameters $(\alpha_1, \alpha_2, \ldots, \alpha_m)$ comprises at least position parameters and deformation parameters.

The values of at least one, for example of all, the surface parameters is determined by a method implemented by computer means for determining surface parameters defining the relative position of a manufactured derivable surface with respect to a nominal surface.

Such method may comprise:
- a nominal surface providing step,
- a measured surface providing step,
- a deformation surface providing step,
- a composed surface determining step, and
- a surface parameter determining step.

During the nominal surface providing step a nominal surface of an ophthalmic lens mounted in a nominal frame of reference and corresponding to the theoretical derivable surface to be manufactured with a nominal value of the position parameters defining the position of the nominal surface with respect to the reference surface is provided.

During the measured surface providing step a measured surface of the manufactured derivable surface expressed in the nominal frame of reference is provided.

During the deformation surface providing step during which at least one deformation surface defined by at least one deformation adjustable parameter is provided.

The deformation surface may correspond to a spherotorus surface defined by a sphere parameter, a cylinder parameter and an axis parameter.

The deformation surface may further correspond to a right circular cone defined by an axis parameter and an angle parameter.

According to an embodiment of the invention, the surface error parameter comprise at least six position parameters, for example three translation parameters $(T_x, T_y, T_z)$ and three rotation parameters $(R_x, R_y, R_z)$ of the at least one manufactured surface of the ophthalmic lens with respect to the nominal surface.

During the composed surface determining step, a composed surface is determined by adding the measured surface and the deformation surface.

During the surface parameter determining step the position parameters and at least one deformation parameter are determined by minimizing the difference between the nominal surface and the composed surface, for example using a damped least squares process.

According to an embodiment, the surface parameter determining step further comprises a zone determining step in which a zone of interest is determined in the nominal surface and the surface parameters are determined by minimizing the difference between the nominal surface and the composed surface in the zone of interest.

During the optical parameters providing step a set of n optical parameters $(P_1, P_2, \ldots, P_n)$ is provided, n being an integer greater than or equal to 1. Each optical parameter $P_i$ is provided with a tolerance value $\varepsilon_i$ defined in reference to a nominal value $P_{i,0}$ being the value of the optical parameter $P_i$ of the nominal ophthalmic lens.

According to an embodiment of the invention, at least one, for example all of the tolerance values εi are set as the applicable standards ISO 8980-1, ISO 8980-2, or ISO 21987, depending on the type of ophthalmic lens.

During the feasibility check determining step, the feasibility of the ophthalmic lens by the ophthalmic lens manufacturing process is determined by determining if for i from 1 to n:

$$-\varepsilon_i \leq \left[ \sum_{j=1}^{m} \left( \frac{\partial P_i}{\partial \alpha_j} \right)_0 \times \Delta \alpha_j \right] + A_i \leq \varepsilon_i$$

with $\left( \frac{\partial P_i}{\partial \alpha_j} \right)_0$ the value of the derivative of $P_i$ with respect to the jth surface parameter $\alpha_j$ on the nominal surface and $\Delta \alpha_j$ the value of the jth surface parameter and $A_i$ a combination of terms of order greater or equal to 2 for each $P_i$.

According to an embodiment of the invention, the value $\Delta \alpha_j$ of the jth surface parameter is an average value of such surface parameter, for example the average value of the surface parameters obtained on similar ophthalmic lenses.

So as to reduce calculation resources, during the feasibility check determining step at least part, for example all, of the feasibility checks are determined by setting for i from 1 to n:

$$A_i = \frac{1}{2} \left[ \sum_{j,k=1}^{m} \left( \frac{\partial^2 P_i}{\partial \alpha_j \partial \alpha_k} \right)_0 \times \Delta \alpha_j \times \Delta \alpha_k \right]$$

with $\left( \frac{\partial^2 P_i}{\partial \alpha_j \partial \alpha_k} \right)_0$ the value of the second derivative of $P_i$ with respect to the jth surface parameter $\alpha_j$ and the kth surface parameter $\alpha_k$ on the nominal surface, $\Delta\alpha_j$ the value of the jth surface parameter and $\Delta\alpha_k$ the value of the kth surface parameter.

In other words, during the feasibility check determining step at least part, for example all, of the feasibility checks are determined by determining if for i from 1 to n:

$$-\varepsilon_i \leq \sum_{j=1}^{m}\left(\frac{\partial P_i}{\partial \alpha_j}\right)_0 \times \Delta\alpha_j + \frac{1}{2}\left[\sum_{j,k=1}^{m}\left(\frac{\partial^2 P_i}{\partial \alpha_j \partial \alpha_k}\right)_0 \times \Delta\alpha_j \times \Delta\alpha_k\right] \leq \varepsilon_i$$

with $\left(\frac{\partial^2 P_i}{\partial \alpha_j \partial \alpha_k}\right)_0$ the value of the second derivative of $P_i$ with respect to the jth surface parameter $\alpha_j$ and the kth surface parameter $\alpha_k$ on the nominal surface, $\Delta\alpha_j$ the value of the jth surface parameter and $\Delta\alpha_k$ the value of the kth surface parameter.

According to an embodiment of the invention, during the feasibility check determining step at least part, for example all, of the feasibility checks are determined by setting $A_i=0$.

In other words, during the feasibility check determining step at least part, for example all, of the feasibility checks are determined by determining if for i from 1 to n:

$$-\varepsilon_i \leq \left[\sum_{j=1}^{m}\left(\frac{\partial P_i}{\partial \alpha_j}\right)_0 \times \Delta\alpha_j\right] \leq \varepsilon_i$$

with $\left(\frac{\partial P_i}{\partial \alpha_j}\right)_0$ the value of the derivative of $P_i$ with respect to the jth surface parameter $\alpha_j$ on the nominal surface and $\Delta\alpha_j$ the value of the jth surface parameter.

Calculating partial derivative of $P_i$ at any order can be very time-consuming. Depending to the optical performance it may be advantageous to limit the order of the calculus of the partial derivative of $P_i$ to the minimum necessary.

Example 1

The inventors have implemented the method according to the invention to determine the influence of a set of surface errors over a set of optical parameters for a given an ophthalmic lens.

In this example the ophthalmic lens is a progressive addition lens. The front surface of the ophthalmic lens has a base curve of 5.5 diopters, an Addition of 2.0 diopters and a "Comfort Varilux" design.

The back surface of the optical lens is spherical and arranged to provide at the near vision point an ophthalmic prescription of 2.0 diopters of sphere, 0 diopter of cylinder and 0° of Axis.

The optical lens is made of an Orma material having a refractive index of 1.502.

The thickness of the optical lens is of at least 0.8 mm along a circle of 60 mm of diameter centered on the prism reference point of the ophthalmic lens. The thickness of the optical lens at the prism reference point is greater than 2.5 mm.

The inventors have chosen to consider the following positioning errors among the surface errors:

D_Tx the translation positioning error of the back surface of the ophthalmic lens relative to the front surface of the ophthalmic lens along the x axis, D_Ty the translation positioning error of the back surface of the ophthalmic lens relative to the front surface of the ophthalmic lens along the y axis, D_Tz the translation positioning error of the back surface of the ophthalmic lens relative to the front surface of the ophthalmic lens along the z axis, D_Rx the rotation positioning error of the back surface of the ophthalmic lens relative to the front surface of the ophthalmic lens about the x axis, D_Ry the rotation positioning error of the back surface of the ophthalmic lens relative to the front surface of the ophthalmic lens about the y axis, and D_Rz the rotation positioning error of the back surface of the ophthalmic lens relative to the front surface of the ophthalmic lens about the z axis.

The inventors have further decided to consider the tilting errors among the surface errors by adding to the back surface:

a D_xx error corresponding to the term $(x/R)^2$ with R the radius of the surface, a D_xy error corresponding to the term $(x/R)*(y/R)$ with R the radius of the surface, and a D_yy error corresponding to the term $(y/R)^2$ with R the radius of the surface.

The optical effects of the above mentioned surface errors have been evaluated on far vision optical parameters and near vision optical parameters.

Among the far vision optical parameters, the inventors have decided to consider the mean optical power at the far vision point with different orientations from the axis of minimum power:

an orientation of 45°: Pfv_45,
an orientation of 30°: Pfv_30, and
an orientation of 60°: Pfv_60.

Among the near vision optical parameters, the have decided to consider the mean optical power at the near vision point with different orientations from the axis of minimum power:

an orientation of 45°: Pnv_45,
an orientation of 30°: Pnv_30, and
an orientation of 60°: Pnv_60.

The optical prismatic effect of the above mentioned surface errors have also been evaluated at the prism reference point of the ophthalmic lens by considering the horizontal prismatic deviation at the prism reference point Dh_prp and the vertical prismatic deviation at the prism reference point Dv_prp.

In this example, for each optical parameter $P_i$ the value of the derivative of $P_i$ with respect to the each surface error parameters has been evaluated.

The result of such evaluation is summarized in FIG. 10.

The table of FIG. 10 can be used to determine the optical properties of a manufactured ophthalmic lens based on measured surface errors.

Typically, when the ophthalmic lens has been manufactured, one may measure the surface errors D_Tx, D_Ty, D_Tz, D_Rx, D_Ry, D_Rz, D_xx, D_xy and D_yy and estimate the expected value of the optical parameters using the table of FIG. 10.

For example, the difference between the nominal value of the average optical power at the far vision point Pfv_45,0 and the obtained value of said average optical power at the far vision point Pfv_45 can be estimated to be equal to:
2.28E-05*D_Tx+7.40E-03*D_Ty−1.73E-02*D_Tz+2.39E-

02*D_Rx+3.40E-05*D_Ry+2.08E-06*D_Rz-5.69E-01*D_xx+2.46E-05*D_xy-5.77E-01*D_yy.

Therefore, by measuring surface error one may determine optical properties of a manufactured ophthalmic lens.

The table provided in FIG. 10 can also be use line by line so as to determine for each surface error the most impacted optical parameters.

For example, the considering the tilting errors D_xx, D_xy and D_yy when analyzing the table of FIG. 10 line by line it appears that such tilting errors of the back surface of the lens have a small impact on the horizontal and vertical prismatic deviations whereas the same tilting error have a great impact on the value of the optical powers at the near and far vision points.

The table of FIG. 10 may also be used row by row so as to determine the surface errors that influence the most a given optical parameter.

For example, when considering the table of FIG. 10, it appears that the optical power parameters Pfv_45, Pfv_30, Pfv_60, Pnv_45, Pnv_30 and Pnv_60 are influenced mainly by the tilting errors D_xx, D_xy and D_yy.

Furthermore, the horizontal prismatic deviation at the prism reference point Dh_prp appears to be much influenced by D_Tx the translation positioning error of the back surface of the ophthalmic lens relative to the front surface of the ophthalmic lens along the x axis and also by;

D_Ry the rotation positioning error of the back surface of the ophthalmic lens relative to the front surface of the ophthalmic lens about the y axis.

Example 2

The inventors have further implemented the method according to the invention to with a progressive addition lens similar to the one of example 1 with a front surface of the ophthalmic lens has a base curve of 5.5 diopters, an Addition of 3.5 diopters and a "Comfort Varilux" design.

The back surface of the optical lens is spherical and arranged to provide at the near vision point an ophthalmic prescription of 0 diopter of sphere, 3 diopters of cylinder and 30° of Axis.

The optical lens is made of an Orma material having a refractive index of 1.502.

The thickness of the optical lens is of at least 0.8 mm along a circle of 60 mm of diameter centered on the prism reference point of the ophthalmic lens. The thickness of the optical lens at the prism reference point is of at least 2.5 mm.

The optical parameters and the surface errors are the same as for example 1. As in example 1, for each optical parameter $P_i$ the value of the derivative of $P_i$ with respect to the each surface error parameters has been evaluated.

The result of such evaluation is summarized in FIG. 11.

Differences appear between example 1 and example 2. For example, one may observe that for the ophthalmic lens according to example 1, the translation positioning error D_Tx of the back surface of the ophthalmic lens relative to the front surface of the ophthalmic lens along the x axis has a very small impact on the vertical prismatic deviation at the prism reference point Dv_prp whereas the same translation positioning error D_Tx of the back surface of the ophthalmic lens relative to the front surface of the ophthalmic lens along the x axis has a great impact on the vertical prismatic deviation at the prism reference point Dv_prp of the ophthalmic lens according to example 2.

Example 3

Example 3 illustrates the use of the tables of example 1 and 2 to determine the feasibility of an ophthalmic lens by an ophthalmic lens manufacturing process.

One may consider a manufacturing process that introduces the following surface errors, each of which have an independent normal distributions having the following standard deviations:

σ_Tx=0.01 mm for the translation positioning error D_Tx of the back surface of the ophthalmic lens relative to the front surface of the ophthalmic lens along the x axis, σ_Ty=0.01 mm for the translation positioning error D_Ty of the back surface of the ophthalmic lens relative to the front surface of the ophthalmic lens along the y axis, σ_Tz=0.01 mm for the translation positioning error D_Tz of the back surface of the ophthalmic lens relative to the front surface of the ophthalmic lens along the z axis, σ_Rx=1° for the rotation positioning error D_Rx of the back surface of the ophthalmic lens relative to the front surface of the ophthalmic lens about the x axis, σ_Ry=0.6° the rotation positioning error D_Ry of the back surface of the ophthalmic lens relative to the front surface of the ophthalmic lens about the y axis, and σ_Rz=0.6° the rotation positioning error D_Rz of the back surface of the ophthalmic lens relative to the front surface of the ophthalmic lens about the z axis, σ_xx=0.005 for the error D_xx, σ_xy=0.005 for the error D_xy, and σ_yy=0.005 for the error D_yy.

The standard deviation for each of the surface errors of the manufacturing process may be determined by manufacturing a sample of predetermined optical lenses.

One may wish that 95% of the optical lenses produced by such manufacturing process respect that:

Pfv_45=Pfv_45 nominal±0.125, with Pfv_45 the mean optical power at the far vision point, Pfv_30=Pfv_30 nominal±0.125, with Pfv_30 the mean optical power at the far vision point, Pfv_60=Pfv_60 nominal±0.125, with Pfv_60 the mean optical power at the far vision point, Pnv_45=Pnv_45 nominal±0.125, with Pnv_45 the mean optical power at the far vision point, Pnv_30=Pnv_30 nominal±0.125, with Pnv_30 the mean optical power at the far vision point, Pnv_60=Pnv_60 nominal±0.125, with Pnv_60 the mean optical power at the far vision point, Dh_prp=Dh_prp_nominal±0.025 with Dh_prp the horizontal prismatic deviation at the prism reference point, and Dv_prp=Dv_prp_nominal±0.025 with Dv_prp the vertical prismatic deviation at the prism reference point.

As a first approximation, to find for each optical parameter, the interval over which 95% of the manufactured ophthalmic lens will fit, one may multiply the corresponding column (in absolute values) of tables of FIGS. 10 and 11 by a vector made of the double of the desired standard deviations.

The inventors have obtained the following results:
for ophthalmic lens according to example 1:

| Pfv45 | Pfv30 | Pfv60 | Pnv45 | Pnv30 | Pnv60 | Dh_prp | Dv_prp |
|---|---|---|---|---|---|---|---|
| 5.97E−02 | 6.50E−02 | 7.00E−02 | 1.54E−01 | 1.19E−01 | 1.92E−01 | 1.08E+00 | 1.72E+00 | for the ophthalmic lens according to example 2:

| Pfv45 | Pfv30 | Pfv60 | Pnv45 | Pnv30 | Pnv60 | Dh_prp | Dv_prp |
|---|---|---|---|---|---|---|---|
| 5.41E−02 | 5.92E−02 | 5.70E−02 | 1.55E−01 | 1.36E−01 | 1.96E−01 | 1.10E+00 | 1.73E+00 |

From the above results it appears that for manufacturing the ophthalmic lenses according to examples 1 and 2 such manufacturing process should not be used.

For the ophthalmic lens according to example 1, it appears that when manufacturing said ophthalmic lens using the above mentioned manufacturing process at least the optical parameters Pnv_45, Pnv_60, Dh_prp and Dv_prp do not respect the desired level of quality.

For the ophthalmic lens according to example 2, it appears that when manufacturing said ophthalmic lens using the above mentioned manufacturing process at least the optical parameters Pnv_45, Pnv_30, Pnv_60, Dh_prp and Dv_prp do not respect the desired level of quality.

As illustrated by example 3, the method of the invention provides a feasibility check of an ophthalmic lens by a manufacturing process.

The invention has been described above with the aid of embodiments without limitation of the general inventive concept. In particular the method according to the invention can be used for double surfacing manufacturing process, i.e. processes during which both the front and back surfaces of the ophthalmic lens are machined.

The invention claimed is:

1. A method, comprising:
   providing a first manufacturing process to make ophthalmic lenses of a first quality and a second manufacturing process to make ophthalmic lenses of a second quality;
   receiving, at a computer having processing circuitry, data representing surfaces of a nominal ophthalmic lens;
   receiving, at the computer, a set of m surface parameters $(\alpha_1, \alpha_2, \ldots, \alpha_m)$, m being an integer greater than or equal to 1, the surface parameters representing differences in position and/or shape of a surface of the ophthalmic lens with respect to the nominal surface;
   receiving, at the computer, a set of n optical parameters $(P_1, P_2, \ldots, P_n)$, n being an integer greater than or equal to 1, each optical parameter $P_i$ being provided with a tolerance value $\varepsilon_i$ that is predetermined based on a type of the ophthalmic lens and that is defined in reference to a nominal value $P_{i,0}$ being a value of the optical parameter $P_i$ of the nominal ophthalmic lens;
   calculating, using the processing circuitry, a feasibility of manufacturing an ophthalmic lens having a particular parameter set by determining whether it is true for i from 1 to n that:

$$-\varepsilon_i \leq \left[\sum_{j=1}^{m} \left(\frac{\partial P_i}{\partial \alpha_j}\right)_0 \times \Delta\alpha_j\right] + A_i \leq \varepsilon_i$$

with $\left(\frac{\partial P_i}{\partial \alpha_j}\right)_0$ being a value of derivative of $P_i$ with respect to jth surface parameter $\alpha_j$, $\Delta\alpha_j$ being an average value of the jth surface parameter obtained on other ophthalmic lenses pre-manufactured by the first manufacturing process, and $A_i$ being a combination of terms having an order of magnitude greater or equal to 2 for each $P_i$; and manufacturing the ophthalmic lens according to the first manufacturing process when the feasibility of manufacturing the ophthalmic lens for each particular parameter set is calculated to be true, and manufacturing the ophthalmic lens according to the second manufacturing process when the feasibility of the manufacturing the ophthalmic lens for each particular parameter set is calculated to be not true,
   wherein the tolerance values are set according to one of standard ISO 8980-1, or standard ISO 8980-2, or standard ISO 21987.

2. The method according to claim 1, wherein, for at least some optical parameters, the calculating of the feasibility includes determining a setting for i from 1 to n:

$$A_i = \frac{1}{2}\left[\sum_{j,k=1}^{m}\left(\frac{\partial^2 P_i}{\partial \alpha_j \partial \alpha_k}\right)_0 \times \Delta\alpha_j \times \Delta\alpha_k\right]$$

with $\left(\frac{\partial^2 P_i}{\partial \alpha_j \partial \alpha_k}\right)_0$ being a value of the second derivative of $P_i$ with respect to the jth surface parameter $\alpha_j$ and kth surface parameter $\alpha_k$, $\Delta\alpha_j$ being the average value of the jth surface parameter, and $\Delta\alpha_k$ being an average value of the kth surface parameter on other ophthalmic lenses.

3. The method according to claim 1, wherein, for some optical parameters, the calculating of the feasibility includes setting $A_i=0$.

4. The method according to claim 1, wherein at least one optical parameter is an optical parameter selected from among the list consisting of: spherical power, astigmatism amplitude and axis, vertical prismatic deviation, horizontal prismatic deviation, and total prismatic deviation.

5. The method according to claim 1, wherein at least an optical parameter is defined at at least one reference point selected from among the list consisting of: a near vision point, a far vision point, a prism reference point, and a fitting cross.

6. The method according to claim 1, wherein at least an optical parameter is an optical parameter defined on a zone corresponding to a vision cone, the vision cone being a cone with the axis of the vision cone passing through the center of rotation of an eye and a reference point of the ophthalmic lens, the aperture of the vision cone being greater than or equal to 5° and smaller than or equal to 20°.

7. The method according to claim 1, wherein a value $\Delta\alpha_j$ derived from the jth surface parameter is an average value of such surface parameter on a surface of the ophthalmic lens.

8. The method according to claim 1, wherein at least one optical parameter is determined under given wearing conditions defined by at least a position of one surface of the ophthalmic lens with respect to a position of a center of rotation of an eye of a wearer and a pantoscopic angle and a wrap angle of the ophthalmic lens.

9. The method according to claim 8, wherein the wearing conditions are defined from measurements on the wearer and a spectacle frame chosen by the wearer.

10. The method according to claim 1, wherein the set of m surface parameters $(\alpha_1, \alpha_2, \ldots, \alpha_m)$ comprises at least position parameters and deformation parameters.

11. The method according to claim 10, further comprising:
obtaining a definition of a nominal surface of an ophthalmic lens in a nominal frame of reference and corresponding to a theoretical derivable surface with a nominal value of the position parameters defining the position of the surface with respect to the reference surface;
obtaining a measured surface of the surface expressed in the nominal frame of reference;
obtaining at least one deformation surface defined by at least one deformation adjustable parameter;
determining a composed surface by adding the measured surface and the deformation surface; and
determining the position parameters and at least one deformation parameter by minimizing the difference between the nominal surface and the composed surface.

12. The method according to claim 11, wherein the position parameters comprise at least six parameters of the surface of the ophthalmic lens with respect to the corresponding surface of the nominal ophthalmic lens.

13. The method according to claim 11, wherein the deformation surface corresponds to a sphero-torus surface defined by a sphere parameter, a cylinder parameter and an axis parameter.

14. The method according to claim 11, wherein the deformation surface corresponds to a right circular cone defined by an axis parameter and an angle parameter.

* * * * *